United States Patent
Gibson et al.

(10) Patent No.: US 9,677,530 B2
(45) Date of Patent: Jun. 13, 2017

(54) ASSISTED DIRECT START ENGINE CONTROL FOR ENHANCED LAUNCH PERFORMANCE

(75) Inventors: Alexander O'Connor Gibson, Ann Arbor, MI (US); Ilya Vladimir Kolmanovsky, Novi, MI (US); Donald Lewis, Vancouver, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1894 days.

(21) Appl. No.: 12/563,203

(22) Filed: Sep. 21, 2009

(65) Prior Publication Data

US 2011/0071746 A1 Mar. 24, 2011

(51) Int. Cl.
*G06F 19/00* (2011.01)
*F02N 11/08* (2006.01)

(52) U.S. Cl.
CPC .... *F02N 11/0837* (2013.01); *F02N 2200/104* (2013.01); *F02N 2200/123* (2013.01); *F02N 2200/125* (2013.01); *F02N 2300/306* (2013.01); *Y02T 10/48* (2013.01)

(58) Field of Classification Search
CPC ........... F02D 2009/0245; F02D 41/042; F02D 41/06; F02D 41/065; F02N 2200/00
USPC ........ 701/112, 113; 123/179.1, 179.3, 179.4, 123/198 D, 198 DC, 198 F
See application file for complete search history.

(56) References Cited

U.S. PATENT DOCUMENTS

| | | |
|---|---|---|
| 4,286,683 A | 9/1981 | Zeigner et al. |
| 6,629,515 B1 | 10/2003 | Yamamoto et al. |
| 6,832,148 B1 * | 12/2004 | Bennett et al. ................. 701/54 |
| 6,882,923 B2 | 4/2005 | Miller et al. |
| 6,968,266 B2 | 11/2005 | Ahmed-Zaid et al. |
| 6,972,675 B2 * | 12/2005 | Mills et al. .................... 340/476 |
| 7,127,337 B2 * | 10/2006 | Bennett et al. ................. 701/22 |
| 7,212,896 B2 | 5/2007 | Coelingh et al. |
| 7,212,905 B2 | 5/2007 | Grill |
| 7,263,209 B2 | 8/2007 | Camus et al. |
| RE40,496 E | 9/2008 | Lu et al. |
| 7,447,592 B2 | 11/2008 | Yopp et al. |

(Continued)

FOREIGN PATENT DOCUMENTS

WO 2007098999 A1 9/2007

OTHER PUBLICATIONS

Office Action dated Apr. 16, 2014, for corresponding Chinese Application 201010293128.3.

*Primary Examiner* — John Kwon
(74) *Attorney, Agent, or Firm* — Julia Voutyras; Brooks Kushman P.C.

(57) ABSTRACT

A system and method for controlling an internal combustion engine include anticipating vehicle launch in response to vehicle position relative to a traffic stream and controlling automatic restart and shut down in response to an anticipated vehicle launch to prevent an automatic engine shut down or to initiate an automatic engine restart. Embodiments include determining vehicle position and traffic position using GPS coordinates. Automatic restart may be initiated in response to movement of a forward vehicle away from the vehicle or in response to a signal from a traffic control device, for example. Automatic shutdown may be inhibited in response to movement of a forward vehicle in cross traffic, in response to a turn indicator being active, or in response to wheel angle, for example.

17 Claims, 3 Drawing Sheets

(56) References Cited

U.S. PATENT DOCUMENTS

| | | |
|---|---|---|
| 7,451,033 B2 | 11/2008 | Xu et al. |
| 7,463,972 B2 | 12/2008 | Yamada et al. |
| 7,493,202 B2 | 2/2009 | Demro et al. |
| 7,515,064 B2 | 4/2009 | Schwartz |
| 7,538,689 B2 | 5/2009 | Haase |
| 7,548,172 B2 | 6/2009 | Shinada et al. |
| 7,553,044 B2 | 6/2009 | Wedell |
| 7,554,457 B2 | 6/2009 | Hounschell, II |
| 7,555,385 B2 | 6/2009 | Niwa et al. |
| 7,575,202 B2 | 8/2009 | Sharkey et al. |
| 7,575,273 B2 | 8/2009 | Wallman et al. |
| 7,853,401 B2 | 12/2010 | Hoetzer |
| 7,933,711 B1 * | 4/2011 | Ulrey et al. .................. 701/112 |
| 2005/0228553 A1 | 10/2005 | Tryon |
| 2006/0053790 A1 | 3/2006 | Foster |
| 2007/0073468 A1 | 3/2007 | Tsukamoto et al. |
| 2007/0282520 A1 | 12/2007 | Cradick et al. |
| 2008/0071460 A1 | 3/2008 | Lu |
| 2010/0191446 A1 * | 7/2010 | McDonald et al. .......... 701/113 |
| 2011/0192374 A1 * | 8/2011 | Ulrey et al. .................. 123/319 |

\* cited by examiner

ASSISTED DIRECT START ENGINE CONTROL FOR ENHANCED LAUNCH PERFORMANCE

BACKGROUND

1. Technical Field

The present disclosure relates to systems and methods for automatic shut down and restart of an internal combustion engine to enhance vehicle launch performance.

2. Background Art

An assisted direct start (ADS) engine may use a number of factors to determine when to shut down and restart the engine to achieve the goal of reducing fuel consumption and emissions while the vehicle is stationary. Typically, the engine is shut down when wheel speed is zero and the brake pedal is depressed (for automatic transmissions), or the transmission is in neutral and the clutch pedal is depressed (for manual transmissions). Other considerations may include the engine coolant temperature, battery state of charge, fuel rail pressure, A/C operation, and others that may be used to prevent an engine shut down and/or to initiate an engine restart. Physical limits of the ADS system associated with engine/transmission inertia, starter design, combustion control limits, etc., may also impose constraints on the time required to shut down and restart the engine. This time may adversely impact vehicle launch performance after an engine shutdown, particular in vehicles with an automatic transmission. As such, it is desirable in some cases to avoid shutting the engine off, or to restart the engine in anticipation of a vehicle launch to improve launch performance.

Prior art strategies may restart the engine when the accelerator pedal is depressed, but the engine start delay and resulting launch performance may be unacceptable for various situations. More complex systems include the use of a vehicle mounted camera to detect traffic signal changes, or a wireless receiver that receives a signal from an intelligent traffic control device to determine when to restart the engine.

SUMMARY

A system and method for controlling an internal combustion engine include anticipating vehicle launch in response to vehicle position relative to a traffic stream and controlling automatic restart and shut down in response to an anticipated vehicle launch to prevent an automatic engine shut down or to initiate an automatic engine restart.

In one embodiment, the system includes a detector that detects distance to one or more surrounding vehicles to identify vehicle position relative to the traffic stream. The detector may include a camera or a directed energy beam, such as a radar or laser transceiver, for example. Vehicle position relative to the traffic stream may also be determined using a global positioning system or similar system to determine vehicle position relative to an intersection or other traffic stream. Systems and methods according to the present disclosure may also include detecting movement of a forward vehicle to initiate an engine restart while the brake pedal is depressed, and/or detecting movement of passing vehicles to inhibit an engine shutdown, such as when the driver is waiting for an opening to merge into the traffic stream.

Various embodiments include determining vehicle position and traffic position using GPS coordinates and/or radar or laser transceivers. Automatic restart may be initiated in response to movement of a forward vehicle away from the vehicle or in response to a signal from a traffic control device, for example. Automatic shutdown may be inhibited in response to movement of a forward vehicle in cross traffic, in response to a turn indicator being active, or in response to wheel angle, for example.

Embodiments of the present disclosure provide various advantages. For example, embodiments according to the present disclosure improve launch performance by anticipating a vehicle launch and controlling the engine to either inhibit automatic shut down, or initiate automatic restart. Use of additional information with respect to the vehicle and surrounding environment enables more judicious determinations in shutting down or restarting the engine to provide acceptable launch performance while improving fuel economy.

The above advantages and other advantages and features of associated with the present disclosure will be readily apparent from the following detailed description of the preferred embodiments when taken in connection with the accompanying drawings.

DETAILED DESCRIPTION

As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
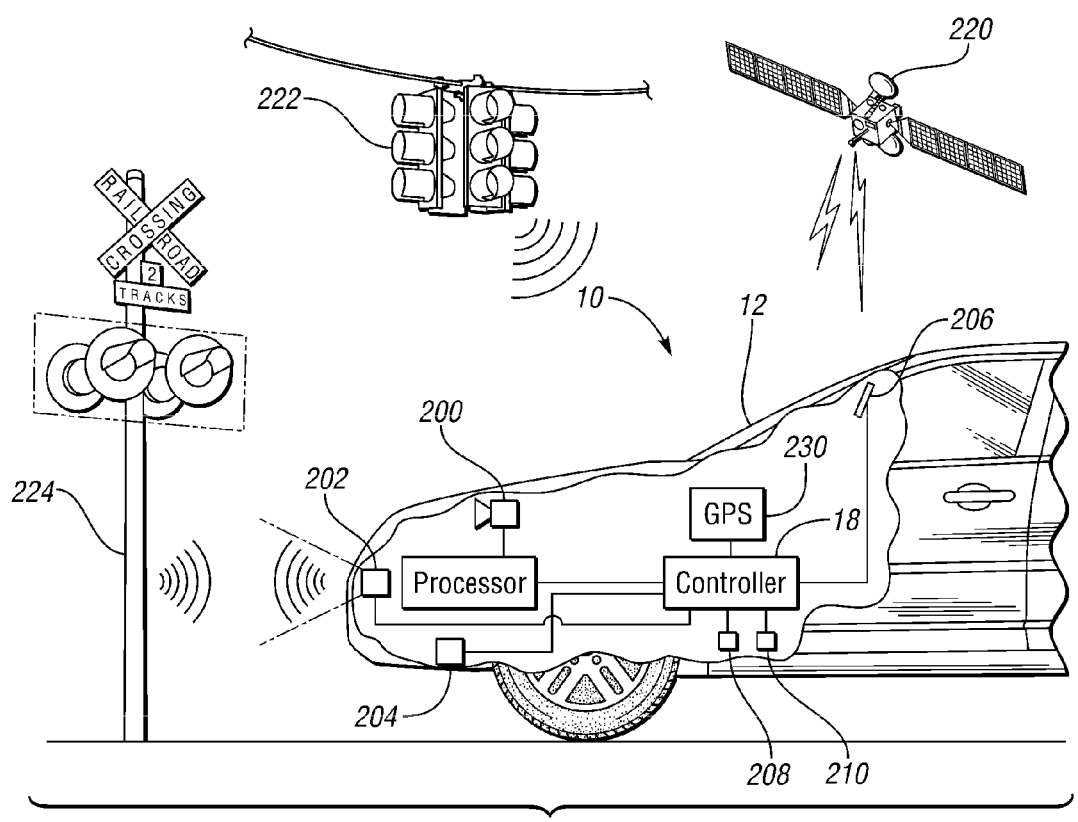
FIG. 1 is a block diagram illustrating operation of a system or method for anticipating a vehicle launch according to embodiments of the present disclosure.

As illustrated in FIG. 1, system 10 includes a vehicle 12 having a controller 18 that processes signals received from various sensors and generates signals for various actuators to control vehicle 12. Controller 18 represents one or more physical controllers that may be separate or integrated and may share control and diagnostic functions. For example, controller 18 may represent a vehicle controller, powertrain controller, engine controller, transmission controller, and/or a dedicated subsystem controller, such as an anti-lock braking system (ABS) controller, suspension controller, etc. Various controllers may communicate diagnostic and control information to one or more other controllers depending on the particular application and implementation.

According to the present disclosure, controller 18 controls vehicle 12, which includes an internal combustion engine 14 (FIG. 2) having automatic shut down and restart capability. In one embodiment, controller 18 receives input from various vehicle sensors or systems, such as a camera 200, forward object detector 202, turn signal indicator 204, receiver or transceiver 206, wheel angle sensor 208, accelerometer 210, and various other sensors illustrated and described with reference to FIG. 2. Controller 18 anticipates desired forward motion or launch of vehicle 12 in response to the position of vehicle 12 relative to a traffic stream and controls the automatic restart and shut down in response to detecting an anticipated vehicle launch to inhibit or prevent an automatic engine shut down or to initiate an automatic engine restart. As used herein, a traffic stream refers to a roadway or other established pathway where vehicles or other traffic travels and where vehicle 12 may be required to yield the right of way after slowing and/or stopping. Those of ordinary skill in the art will appreciate that a vehicle launch may also include maneuvers required to move the vehicle into position prior to actually entering the traffic stream, i.e. movement of one or more forward vehicles to enter the traffic stream may require a vehicle launch to move the vehicle closer to the traffic stream prior to actually entering the traffic stream.

FIG. 1 also illustrates various external devices that may provide information to vehicle 12 and controller 18, or that may be sensed/detected by onboard sensors and detectors, such as camera 200, forward object detector 202, and/or transceiver 206. In one embodiment, transceiver or receiver 206 receives signals from one or more satellites 220 and one or more traffic control devices, such as traffic light 222 and railroad crossing signal 224. Information received from satellites 220 or land-based radio broadcast towers may provide global positioning information processed by a global positioning system (GPS) 230 or other navigation system to identify vehicle position and proximity to a traffic stream where vehicle launch is anticipated. Information received from, or relative to, various external devices may be used in combination with current vehicle operating conditions in anticipating a vehicle launch and controlling the automatic shut down and restart of the engine as described in greater detail herein. For example, vehicle 12 may use information from satellites 220 for processing by GPS 230 to determine vehicle position relative to a traffic stream, in addition to information from turn signal indicator 204 to detect an anticipated launch when the vehicle turn indicator is active and the vehicle is within a predetermined distance of an intersection. Similarly, an anticipated vehicle launch may be determined or detected in response to a signal received from traffic signal 222, or in response to a signal received from railroad crossing gate 224. Alternatively, or in combination, forward object detector 202 may detect distance from a forward vehicle and process changing distance information to determine that the forward vehicle is moving to initiate an engine restart in anticipation of a vehicle launch.

As also illustrated in FIG. 1, in addition to detecting movement of a forward vehicle away from vehicle 12, camera 200 and/or forward object detector 202 may be used to detect position of vehicle 12 relative to a traffic stream by processing video images or reflected energy beam signals (such as radar or laser signals, for example) to detect cross traffic traveling through a field of view of camera 200 or detector 202, and determining vehicle position or distance relative to the cross traffic, for example.

When an anticipated vehicle launch is detected, controller 18 may inhibit an automatic engine shut down if the engine is currently running, or may restart the engine if the engine has been shut down in anticipation of the vehicle launch to improve launch performance.

Figure 2:
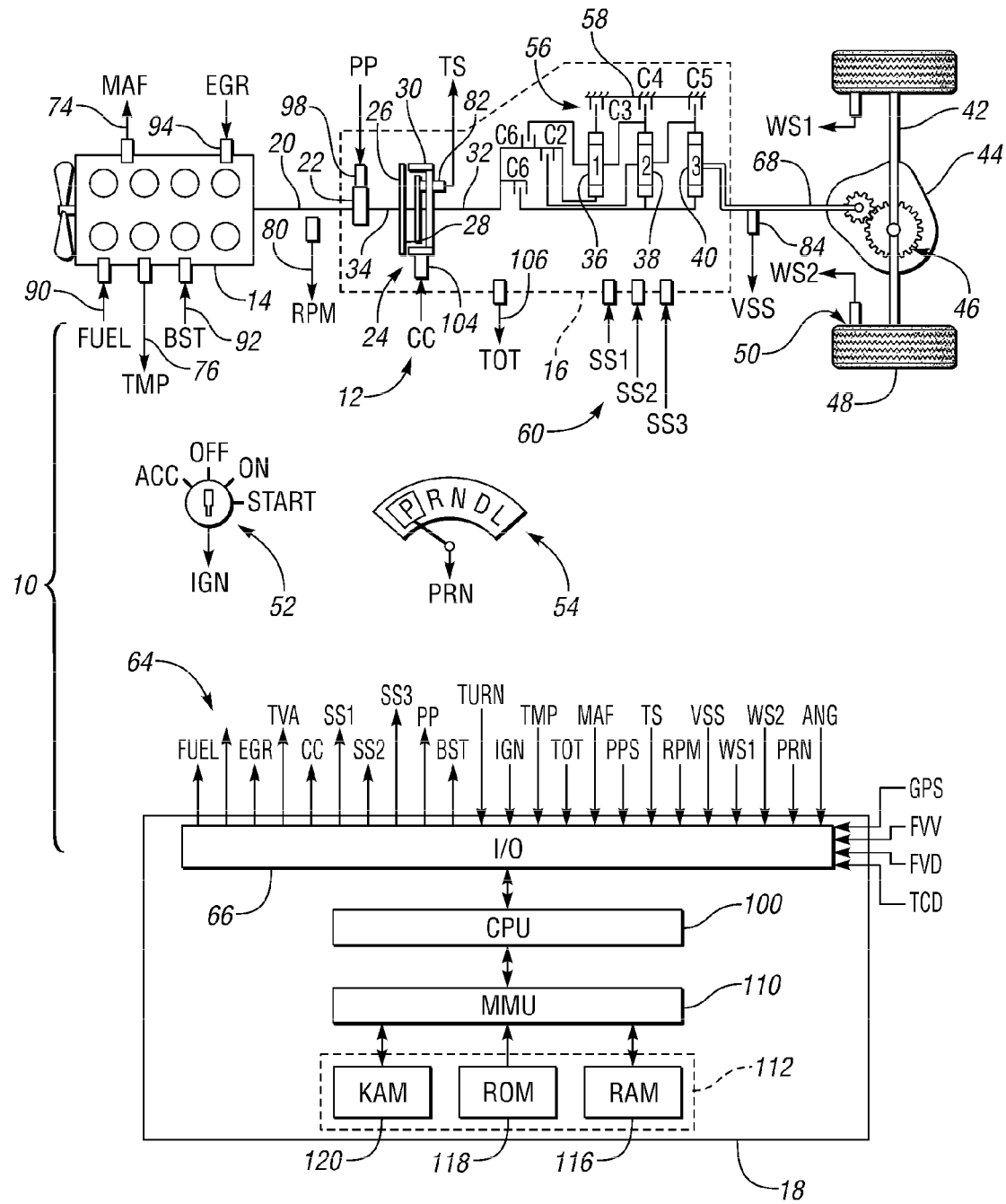
FIG. 2 is a block diagram illustrating representative sensors that can be used in anticipating a vehicle launch to control automatic shut down and restart according to embodiments of the present disclosure.

FIG. 2 is a block diagram illustrating additional details of the operation of a system or method for controlling an internal combustion engine to improve vehicle launch performance according to the present disclosure. In this embodiment, system 10 includes a vehicle powertrain 12 having an internal combustion engine 14 coupled to an electronically controlled fully or semi-automated transmission 16. The teachings of the present disclosure may also be applied to applications where powertrain 12 includes a manual transmission. Powertrain 12 may also include a controller 18 in communication with engine 14 and transmission 16 for providing various information and control functions. As previously described, those of ordinary skill in the art will appreciate that control functions performed by controller 18 may be divided between or among dedicated engine, transmission, and/or other component controllers depending upon the particular application and implementation. For multiple controller applications, the controllers may communicate using a standard data bus or via signal wires, for example, to exchange information relative to engine and transmission control consistent with the teachings of the present disclosure to anticipate vehicle launch and control automatic shutdown/restart in response.

Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34. Although transmission 16 is depicted as a fully automatic electronically controlled transmission with a torque converter, the present disclosure applies to applications having other types of fully automatic, semi-automatic, or manual transmissions that may or may not include a torque converter.

Transmission 16 is generally of conventional design and may include various input-to-output ratios or gear ratios effected by various gears or gearsets, indicated generally by reference numerals 36, 38, and 40 and associated frictional elements such as clutches (C1-C6), bands, and the like, represented generally by reference numeral 56 as well known in the art. Gears 36, 38, and 40 in combination with torque converter 24 provide selective reduction or multiplication ratios between turbine shaft 32 and output shaft 68 based on engagement or activation of appropriate clutches C1-C6. Transmission 16 may be electronically controlled via one or more shift solenoids, indicated generally by reference numeral 60, to select or engage one or more gear ratios and provide information to controller 18 with respect to the current gear ratio.

Depending upon the particular application, output shaft 68 may be coupled to one or more axles 42 via a final drive reduction or differential 44 which may include one or more gears, as indicated generally by reference numeral 46. Each axle 42 may include two or more wheels 48 having corresponding wheel speed sensors 50, with one or more front wheels also having associated steering angle sensors 208 (FIG. 1). Although a rear wheel drive application is illustrated, the present disclosure is independent of the particular powertrain arrangement and is applicable to various other powertrains including but not limited to front wheel drive and all-wheel drive applications.

Powertrain 12 includes a plurality of sensors and actuators, indicated generally by reference numeral 64, in communication with corresponding input/output (I/O) ports 66 of controller 18 to sense or monitor the current operating and ambient conditions of powertrain 12 and control the automatic shutdown/restart operation of engine 14 in anticipation of vehicle launch. While the particular sensors and actuators 64 may vary depending upon the application and implementation, the representative system 10 includes a mass air flow sensor (MAF) 74 that provides an indication of the air mass flowing through the engine intake. A temperature sensor (TMP) 76 provides an indication of the engine coolant temperature, or alternatively engine oil temperature. An engine speed sensor (RPM) 80 monitors rotational speed of crankshaft 20. Similarly, a turbine speed sensor (TS) 82 monitors the rotational speed of the turbine 28 of torque converter 24. Another rotational speed sensor, vehicle speed sensor (VSS) 84, provides an indication of the speed of output shaft 68 which may be used to determine the vehicle speed based on the ratio of differential 44 and the size of wheels 48. Of course, wheel speed sensors (WS1 and WS2) 50 may be used to provide an indication of the vehicle speed as well.

An ignition switch 52 or similar device may be provided to control initial starting and running of engine 14 and various vehicle accessories by an appropriate signal or signals provided directly to various corresponding engine components (such as a starter motor, for example), and/or signals processed through controller 18. Ignition switch 52 provides a request for engine shutdown to controller 18 when turned to the "off" position. However, the assisted direct start feature, also referred to as the automatic shutdown/restart feature, may also shut down the engine when switch 52 is in the "ON" position to improve fuel economy and reduce emissions under certain vehicle and ambient operating conditions. However, automatic restart will not be performed with switch 52 in the "OFF" position.

In addition to previously described sensors or indicators that may be used to anticipate a vehicle launch, a transmission gear selector 54 may be used by the vehicle operator to request or select a desired gear or driving mode and provides a corresponding signal (PRN) to controller 18. For manual transmission applications, a similar gear selector sensor, and/or neutral switch may be used in anticipating a vehicle launch. In the illustrated representative system 10, gear selector 54 includes positions for selection of PARK (P), REVERSE (R), NEUTRAL (N), DRIVE (D) and LOW (L). However, the present invention is independent of the particular gears or modes available. The actual gear or state of transmission 16 is directed by controller 18 based on the selected or desired gear or mode indicated by selector 54 in addition to current engine, transmission, vehicle, and/or ambient operating conditions. In one embodiment, a vehicle launch is anticipated when gear selector 54 is moved from park or neutral to drive or low with engine 14 controlled to initiate an automatic restart.

Various actuators 64 are used to provide control signals or to effect movement of various devices in powertrain 12. Actuators 64 may include actuators for timing and metering fuel (FUEL) 90, which may include a fuel pump and/or at least one electronically controlled fuel injector to provide direct or port fuel injection to the engine cylinders, for example, to automatically restart engine 14 in response to an anticipated vehicle launch. Actuators may also be used to control turbocharger boost pressure 92 (BST) and for setting the amount of exhaust gas recirculation (EGR) 94 for engines so equipped. Multiple cylinder internal combustion engine 14 may be a spark-ignition or compression-ignition engine depending on the application. Spark-ignition engines may include alternate or additional sensors, actuators, and drivers, such as those used to control spark timing and throttle valve position, for example. Automatic transmission 16 may be selectively regulated by controlling transmission pump or line pressure using an appropriate actuator (PP) 98 in combination with shift solenoids (SS1, SS2, and SS3) 60 which are used to select an appropriate gear ratio. Automatic transmission 16 may include a torque converter clutch 30 operable via an appropriate actuator or solenoid (CC) 104. A temperature sensor 106 may be provided to determine the transmission oil temperature (TOT). Various inputs may also be used to detect or determine vehicle position relative to a traffic stream, including inputs from a global positioning system (GPS), information from sensors or systems indicating forward vehicle (or object) velocity (FVV), forward vehicle distance (FVD), and/or status of a traffic control device (TCD), etc.

Controller 18 is a programmable controller implemented by a microprocessor-based controller or computer in the illustrated embodiments that provides integrated control of engine 14 and transmission 16 of vehicle 12. Of course, the present invention may be implemented using separate engine and transmission controllers that communicate appropriate parameters to provide coordinated control of the engine shutdown and restart process to improve launch performance. Controller 18 has a microprocessor 100 or central processing unit (CPU), in communication with memory management unit (MMU) 110. MMU 110 controls the movement of data among the various computer readable storage media 112 and communicates data to and from CPU 100. The computer readable storage media may include volatile and nonvolatile storage in read-only memory (ROM) 118, random-access memory (RAM) 116, and keep-alive memory (KAM) 120, for example. KAM 120 may be used to store various operating variables while CPU 100 is powered down. The computer-readable storage media 112 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 100 in controlling system 10. The computer-readable storage media 112 may also include floppy disks, CD-ROMs, hard disks, and the like.

With reference to FIGS. 1 and 2, in operation, an automatic shutdown request may be generated in response to conventional parameters or entry conditions, such as wheel speed being below a threshold (or zero) and the brake pedal being depressed for a predetermined period of time, indicating that the vehicle 12 is stationary. However, to improve vehicle launch performance according to the present disclosure, controller 18 may detect an anticipated or impending vehicle launch based on information from a combination of the sensors, detectors, and devices previously described and inhibit or prevent an automatic shutdown of engine 14. Alternatively, if appropriate conditions are met indicating there is no impending or imminent vehicle launch, an automatic engine shutdown may be immediately initiated without waiting for a predetermined period of time. For example, if vehicle 12 approaches a railroad crossing with signal activated, various information could be used to initiate an immediate shutdown of engine 14, such as a signal received from crossing signal 224 (FIG. 1), the driver changing gear selector 54 to "P", or a manual transmission to neutral, or a train being detected crossing the field of view of camera 200 or forward object detector 202, for example.

After engine 14 has been automatically shut down, controller 18 may initiate an automatic restart in response to a forward vehicle moving away from vehicle 12 by a predetermined distance, or at a predetermined speed, in response to a signal from a traffic control device 224, 226, and/or in response to one or more other inputs, for example, as described in greater detail herein.

Figure 3:
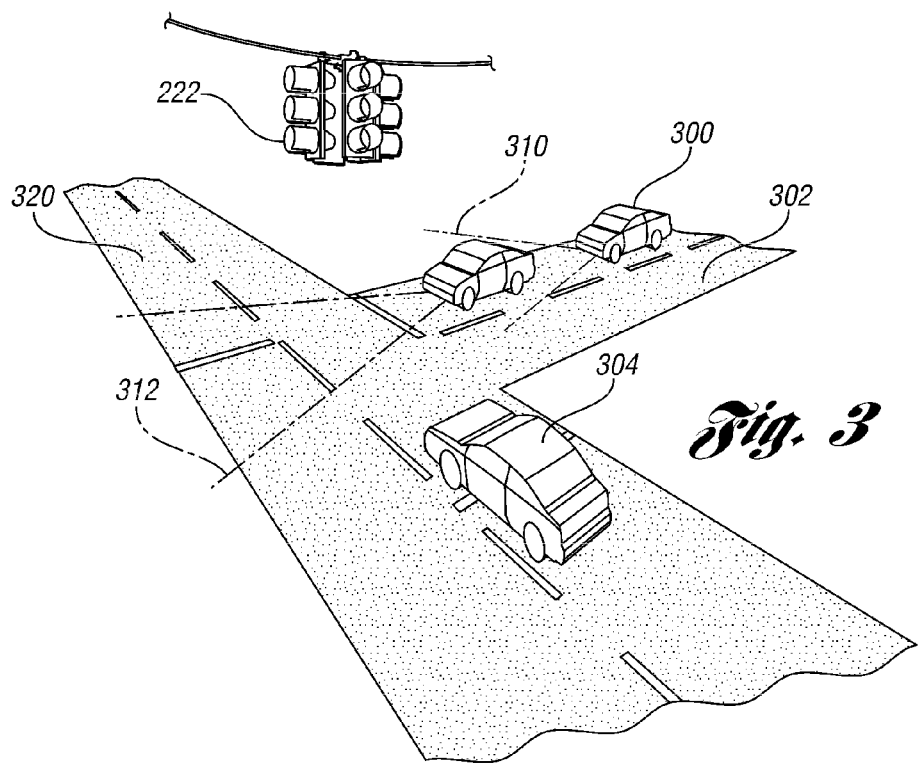
FIG. 3 illustrates operation of systems or methods for controlling an engine in anticipation of a vehicle launch according to embodiments of the present disclosure.

FIG. 3 illustrates operation of a system or method for controlling an engine in response to anticipating a vehicle launch according to the present disclosure. In this example, vehicles 300, 302 are waiting to enter traffic stream 320, which may be detected using any number of techniques according to the present disclosure. For example, traffic stream 320 may be detected based on GPS coordinates of vehicle 302 and of known coordinates of traffic stream or roadway 320. Alternatively, vehicle 302 may include one or more detectors that detect a crossing vehicle 304 passing through a corresponding field of view 312. Traffic stream 320 may also be detected using a signal broadcast from an associated traffic control device 222 or remotely located traffic tower, for example. Similarly, GPS coordinates and/or input from sensors or cameras may be used to determined the position of vehicles 300, 302 relative to traffic stream 320. In this example, the determination of vehicle 300 indicates that a forward vehicle (302) is present, such that anticipation of a vehicle launch for vehicle 300 may be detected in response to vehicle 302 moving away from vehicle 300 a predetermined distance, or at a predetermined speed/velocity. For vehicle 302, vehicle launch may be anticipated in response to a status signal broadcast by traffic control device 222, by an operator activating a turn signal indicator, or turning the steering wheels to enter into the traffic stream 320.

The determination of an anticipated vehicle launch may vary depending on the particular information available relative to traffic stream 320. For example, if traffic stream 320 includes a passive traffic control device, such as a stop sign, proximity of vehicle 302 to traffic stream 320 may be sufficient to inhibit an automatic engine shutdown. As an example, even if vehicle 302 must wait a significant amount of time for crossing traffic 304, vehicle 302 may detect an anticipated launch based on the position or proximity of vehicle 302 relative to traffic stream 320, i.e. being next in line. In contrast, vehicle 300 detects a forward vehicle 302 and/or a greater distance to traffic stream 320 such that an automatic shut down may be allowed, or initiated sooner than in conventional automatic shutdown/restart systems.

Figure 4:
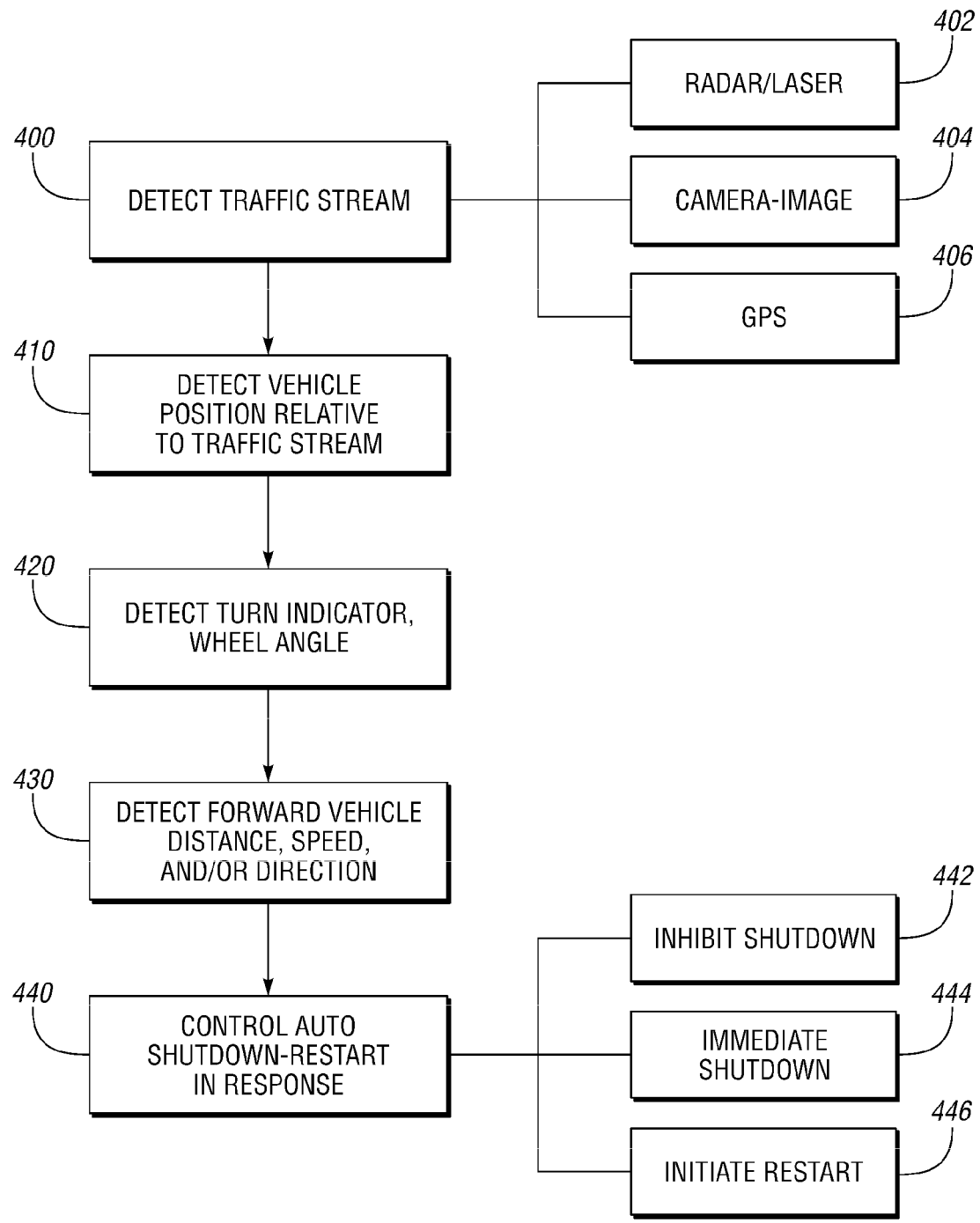
FIG. 4 is a flow chart illustrating operation of a system or method for anticipating vehicle launch according to embodiments of the present disclosure.

FIG. 4 is a flow chart illustrating operation of a system or method for controlling an engine having an automatic shutdown/restart feature according to the present disclosure. The diagram of FIG. 4 provides a representative control strategy for an internal combustion engine in response to information indicative of an impending or imminent vehicle launch, or a determination that no vehicle launch is imminent. The control strategy and/or logic illustrated in FIG. 4 is generally stored as code implemented by software and/or hardware in controller 18. Code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

Preferably, the control logic or code represented by the simplified flow chart of FIG. 4 is implemented primarily in software with instructions executed by a microprocessor-based vehicle, engine, and/or powertrain controller, such as controller 18 (FIGS. 1-2). Of course, the control logic may be implemented in software, hardware, or a combination of software and hardware in one or more controllers or equivalent electronics depending upon the particular application. When implemented in software, the control logic is preferably provided in one or more computer-readable storage media having stored data representing code or instructions executed by a computer to control one or more components of the engine. The computer-readable storage media may include one or more of a number of known physical devices which utilize electric, magnetic, optical, and/or hybrid storage to keep executable instructions and associated calibration information, operating variables, and the like.

A traffic stream is detected as represented by block 400 of FIG. 4. Detection of a traffic stream may be based on input from a radar or laser system 402 or images processed by one or more cameras 404 as previously described. As generally understood by those of ordinary skill in the art, radar/laser systems 402 use a transceiver to transmit a directed energy beam of electromagnetic energy that it reflected from an object of interest, such as a forward vehicle moving in the same direction, or across a field of view of the sensor. The reflected signal received by the transceiver is processed to determine the distance and/or velocity of the object of interest. A traffic stream may also be detected using GPS coordinates 406.

One or more of the systems 402, 404, and 406 may also be used in determining or detecting vehicle position relative to the traffic stream as represented by block 410. In addition to detecting the vehicle position relative to a traffic stream at 410, various embodiments may include detecting status of a turn indicator and/or steering wheel angle as represented by block 420, and detecting distance, speed, and/or direction of travel of a forward vehicle as represented by block 430. Other sensor inputs may also be considered to anticipate a vehicle launch and to control the automatic restart and shut down function in response to detecting an anticipated vehicle launch as generally represented by block 440. As previously described, an engine shutdown may be inhibited or prevented as represented by block 442 if the engine is running and an impending vehicle launch is detected. Conversely, an immediate shutdown may be initiated as represented by block 444 if information indicates that the vehicle speed is near zero, but no vehicle launch is anticipated. When a vehicle launch is anticipated, control 440 may include initiating an immediate automatic restart as represented by block 446.

As the embodiments described above illustrate, the present disclosure provides various advantages. For example, embodiments according to the present disclosure improve launch performance by anticipating a vehicle launch and controlling the engine to either inhibit automatic shut down, or initiate automatic restart. Use of additional information with respect to the vehicle and surrounding environment enables more judicious determinations in shutting down or restarting the engine to provide acceptable launch performance while improving fuel economy.

While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure and may be desirable for particular applications.

What is claimed:

1. A method for controlling a vehicle with internal combustion engine having automatic restart and automatic shut down, the method comprising:
   anticipating vehicle launch in response to vehicle position relative to a traffic stream by detecting movement of a forward vehicle across a detector field of view;
   controlling the automatic restart in response to detecting an anticipated vehicle launch; and
   controlling the automatic shut down in response to detecting no anticipated vehicle launch.

2. The method of claim 1 wherein the traffic stream includes cross traffic through an intersection and wherein anticipating vehicle launch comprises:
   detecting a vehicle turn indicator; and
   detecting an anticipated launch when the vehicle turn indicator is active and the vehicle is within a predetermined distance of the intersection.

3. The method of claim 1 wherein detecting movement of a forward vehicle comprises processing a video image.

4. The method of claim 1 further comprising preventing an automatic engine shut down in response to a signal received from a traffic control device.

5. The method of claim 1 wherein anticipating vehicle launch comprises detecting speed of a forward vehicle, the method further comprising preventing an automatic engine shut down when the forward vehicle speed exceeds a corresponding threshold.

6. The method of claim 1 wherein anticipating vehicle launch comprises detecting an anticipated launch when wheel turning angle exceeds a corresponding threshold.

7. The method of claim 1 wherein controlling the automatic restart comprises initiating an automatic engine restart in response to a signal received from a traffic control device.

8. The method of claim 1 wherein anticipating vehicle launch comprises detecting vehicle position relative to a traffic stream, the method further comprising processing a signal from at least one of a satellite and radio broadcast tower.

9. A method for controlling an internal combustion engine having automatic restart and automatic shut down, comprising:
   anticipating vehicle launch in response to vehicle position relative to a traffic stream by detecting movement of a forward vehicle by processing a directed energy beam signal reflected from the forward vehicle;
   controlling the automatic restart in response to detecting an anticipated vehicle launch; and
   controlling the automatic shut down in response to detecting no anticipated vehicle launch.

10. A system for controlling an internal combustion engine of a vehicle comprising:
    at least one sensor that provides a signal indicative of vehicle position relative to a traffic stream and detects movement of a forward vehicle;
    a controller in communication with the at least one sensor, the controller anticipating vehicle launch in response to the vehicle position relative to the traffic stream when movement of the forward vehicle exceeds a corresponding threshold and controlling automatic restart and shut down of the engine based on a determination of whether or not a vehicle launch is anticipated.

11. The system of claim 10 wherein the traffic stream includes cross traffic through an intersection and wherein the controller detects a vehicle turn indicator and detects an anticipated launch when the vehicle turn indicator is active and the vehicle is within a predetermined distance of the intersection.

12. The system of claim 10 wherein the corresponding threshold represents a distance threshold.

13. The system of claim 10 wherein the corresponding threshold represents a speed threshold.

14. The system of claim 10 wherein the at least one sensor comprises a camera and wherein the controller detects an anticipated vehicle launch when the camera detects traffic crossing in front of the vehicle.

15. The system of claim 10 wherein the at least one sensor comprises a non-imaging transceiver that transmits an electromagnetic beam and determines distance to a forward vehicle based on a received beam reflected from the forward vehicle.

16. The system of claim 10 further comprising a transceiver that receives a signal indicative of the vehicle position relative to position of a traffic stream.

17. A method for controlling an internal combustion engine having automatic restart and automatic shut down, comprising:
    anticipating vehicle launch in response to vehicle position relative to a traffic stream;
    controlling the automatic restart in response to detecting an anticipated vehicle launch; and
    controlling the automatic shut down in response to detecting no anticipated vehicle launch, wherein controlling the automatic shut down comprises preventing an automatic engine shut down to maintain engine operation.

* * * * *